United States Patent
Laas et al.

(10) Patent No.: US 7,939,598 B2
(45) Date of Patent: May 10, 2011

(54) POLYISOCYANATE MIXTURES COMPRISING CYCLOALIPHATIC STRUCTURAL ELEMENTS

(75) Inventors: Hans-Josef Laas, Odenthal (DE);
Reinhard Halpaap, Odenthal (DE);
Dieter Mager, Leverkusen (DE);
Markus Mechtel, Bergisch Gladbach (DE); Michael Ehlers, Krefeld (DE);
Reinhard Hertrampf, Langenfeld (DE)

(73) Assignee: Bayer MaterialScience AG, Leverkusen (DE)

( * ) Notice: Subject to any disclaimer, the term of this patent is extended or adjusted under 35 U.S.C. 154(b) by 14 days.

(21) Appl. No.: 12/315,980

(22) Filed: Dec. 9, 2008

(65) Prior Publication Data
US 2009/0156738 A1 Jun. 18, 2009

(30) Foreign Application Priority Data
Dec. 12, 2007 (DE) .................. 10 2007 059 859

(51) Int. Cl.
*B32B 27/00* (2006.01)
*B32B 27/40* (2006.01)
*C08G 18/00* (2006.01)
*C08G 18/08* (2006.01)
*C08G 18/28* (2006.01)
*C08G 18/70* (2006.01)
*C08G 18/81* (2006.01)
*C08L 75/00* (2006.01)

(52) U.S. Cl. ............... 524/590; 428/423.1; 524/589; 528/44; 528/45; 528/67; 528/85

(58) Field of Classification Search .......... 524/589, 524/590; 528/44, 45, 67, 85; 428/423.1
See application file for complete search history.

(56) References Cited

U.S. PATENT DOCUMENTS

| | | | |
|---|---|---|---|
| 5,126,170 | A | 6/1992 | Zweiner et al. |
| 5,236,741 | A | 8/1993 | Zweiner et al. |
| 5,252,696 | A | 10/1993 | Laas et al. |
| 5,914,383 | A | 6/1999 | Richter et al. |
| 6,096,835 | A | 8/2000 | Vandevoorde et al. |
| 6,426,414 | B1 | 7/2002 | Laas et al. |
| 6,562,894 | B1 | 5/2003 | Blum et al. |
| 6,765,111 | B1 | 7/2004 | Pedain et al. |
| 6,767,958 | B2 | 7/2004 | Laas et al. |

FOREIGN PATENT DOCUMENTS

| | | |
|---|---|---|
| EP | 649866 A1 | 4/1995 |
| GB | 1145952 | 3/1969 |
| GB | 2123841 A | 2/1984 |
| WO | 9716467 | 5/1997 |

OTHER PUBLICATIONS

U. Meier-Westhues, Polyurethane-Lacke, Kleb—und Dichtstoffe, Vincentz Network, 2007, p. 166.
Hans Josef Laas et al, J. Prakt. Chem. 336 (1994, pp. 185-200.

*Primary Examiner* — Patrick D Niland
(74) *Attorney, Agent, or Firm* — Robert S. Klemz; Noland J. Cheung

(57) ABSTRACT

The present invention relates to innovative polyisocyanate mixtures comprising cycloaliphatic structural elements and containing exclusively linear-aliphatically attached free isocyanate groups, to a process for preparing them and to their use as a starting component in the production of polyurethane plastics, more particularly as a crosslinker component in polyurethane coating materials and coatings.

13 Claims, No Drawings

POLYISOCYANATE MIXTURES COMPRISING CYCLOALIPHATIC STRUCTURAL ELEMENTS

CROSS-REFERENCE TO RELATED APPLICATIONS

The present application claims the right of priority under 35 U.S.C. §119(a)-(d) of German Patent Application Number 10 2007 059 859.0, filed Dec. 12, 2007.

BACKGROUND OF THE INVENTION

The present invention relates to innovative polyisocyanate mixtures comprising cycloaliphatic structural elements and containing exclusively linear-aliphatically attached free isocyanate groups, to a process for preparing them and to their use as a starting component in the production of polyurethane plastics, more particularly as a crosslinker component in polyurethane coating materials and coatings.

The outstanding technological properties of two-component polyurethane (2K-PUR) coating materials have given them importance for a multiplicity of different applications. As crosslinker components for light-stable, non-yellowing 2K-PUR coating materials and coatings, it is common to use polyisocyanates based on linear-aliphatic and/or cycloaliphatic diisocyanates.

In the most applications of 2K-PUR coating materials, polyisocyanates based on 1,6-diisocyanatohexane (HDI) are presently employed. Even at low temperatures, these polyisocyanates lead to coatings having good resistance to chemical and mechanical exposure, but in many cases exhibit an inadequate drying rate and comparatively low ultimate hardnesses.

The same is true for the use of special high-functionality HDI polyisocyanates, examples being high-functionality HDI trimers, which are often recommended as crosslinker components for the formulation of quick-drying 2K-PUR coating materials (see, for example, product information on Tolonate® XFD 90 B, Rhodia PCS). Although it is indeed possible using such crosslinkers to raise the drying rate in relation to standard crosslinkers, a higher ultimate hardness on the part of the coating films is not obtained.

With respect to achievable film hardness, distinct advantages are possessed by polyisocyanate crosslinkers based on cycloaliphatic diisocyanates, such as isophorone diisocyanate (IPDI), for example. While polyisocyanates based on linear aliphatic diisocyanates are distinguished in particular by low viscosities and produce coating films of high elasticity, cycloaliphatic polyisocyanates in solvent-free form are highly viscous to solid products which lead to rapid physical drying of a coating preparation and yield coatings of very high hardness.

HDI polyisocyanates are therefore used frequently in combination with corresponding cycloaliphatic polyisocyanates, examples being those based on IPDI (see, for example, U. Meier-Westhues, Polyurethane-Lacke, Kleb-und Dichtstoffe, Vincentz Network 2007, p. 166). In this way the drying of the coating films, and more particularly the development of hardness, can be considerably accelerated. For complete chemical crosslinking, however, cycloaliphatic polyisocyanates, on account of the lower reactivity of their isocyanate groups, require temperatures in the region of 100° C. or above. In the case of room temperature or slightly forced drying (about 60° C.), the coating films obtained are indeed rapidly touch-dry and hard, but exhibit lower solvent resistance and chemical resistance than coatings crosslinked exclusively using HDI polyisocyanates.

It was an object of the present invention, therefore, to provide new polyisocyanates which are suitable for all fields of application of aliphatic polyisocyanates, and more particularly as crosslinker components for 2K polyurethane coating materials, but which are not hampered by the disadvantages of the known systems. These new polyisocyanate crosslinkers ought to permit the formulation of quick-drying coating systems which at the same time cure even at low temperatures to give hard, solvent-resistant and chemical-resistant coatings.

SUMMARY OF THE INVENTION

The invention provides a process for preparing polyisocyanate mixtures comprising cycloaliphatic structural elements and also linear-aliphatically attached free isocyanate groups, the process comprising reacting:
A) a polyisocyanate component having an average functionality of 2.0 to 5.0 and a linear-aliphatically attached isocyanate group content (calculated at NCO; molecular weight=42) of 8.0% to 27.0% by weight
with
B) 2 to 80% by weight, based on the total amount of components A) and B), of at least one hydroxyurethane which is based on a cycloaliphatic di- and/or polyisocyanate, is free from isocyanate groups, optionally contains urea groups, has a number-average molecular weight of 260 to 8000 g/mol and has an average OH functionality of 1.0 to 6.0.

The invention further provides the polyisocyanate mixtures obtained in this way, and also the use of the products obtained by this process as starting components in the production of polyurethane plastics, more particularly as a crosslinker component in polyurethane coating materials and coatings.

DETAILED DESCRIPTION OF THE PREFERRED EMBODIMENTS

In the context of the present invention a distinction is made between "linear-aliphatically" and "cycloaliphatically" attached isocyanate groups, these terms referring to the chemical structure of the diisocyanates employed in accordance with the invention and polyisocyanates prepared from them. By "linear-aliphatic" diisocyanates are meant those compounds which are entirely free from cyclic structural elements, while in the "cycloaliphatic" diisocyanates there must be at least one isocyanate group attached to a cycloaliphatic ring.

The polyisocyanate component A) for use in the process of the invention generally has an (average) NCO functionality of 2.0 to 5.0, preferably of 2.3 to 4.5, an isocyanate group content of 8.0% to 27.0% by weight, preferably 14.0% to 24.0% by weight, and a monomeric diisocyanate content of less than 1% by weight, preferably less than 0.5% by weight. The polyisocyanate component A) comprises at least one organic polyisocyanate that contains exclusively linear-aliphatically attached isocyanate groups.

The polyisocyanates of component A) are any desired polyisocyanates with uretdione, isocyanurate, allophanate, biuret, iminooxadiazinedione and/or oxadiazinetrione structure that are prepared by modification of simple linear-aliphatic diisocyanates and are composed of at least two diisocyanates; polyisocyanates of this kind are described by way of example in J. Prakt. Chem. 336 (1994) 185-200, in DE-A 1 670 666 and EP-A 0 798 299, for example.

Suitable diisocyanates for preparing such polyisocyanates are any desired linear-aliphatic diisocyanates that are obtainable through phosgenation or by phosgene-free processes, as for example by thermal urethane cleavage, i.e., those which contain no cycloaliphatic structures. Preferred linear-aliphatic diisocyanates are those of the molecular weight range 140 to 336 g/mol, such as 1,4-diisocyanatobutane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, or any desired mixtures of such diisocyanates.

It is preferred in A) to use exclusively polyisocyanates having linear-aliphatically attached isocyanate groups, and so the polyisocyanate mixtures obtainable by the process of the invention contain exclusively linear-aliphatically attached isocyanate groups.

The polyisocyanates used in A) are preferably those of the aforementioned kind with uretdione, isocyanurate, allophanate, biuret and/or iminooxadiazinedione structure that are based on HDI.

Very particular preference is given to using as starting components in A) HDI polyisocyanates with isocyanurate structure and/or iminooxadiazinedione structure.

Component B) to be used in the process of the invention comprises at least one hydroxyurethane which is based on a cycloaliphatic di- and/or polyisocyanate, is free from isocyanate groups, optionally contains urea groups, has a number-average molecular weight of 260 to 8000 g/mol, preferably of 275 to 6000 g/mol, more preferably of 290 to 5000 g/mol, and has an average OH functionality of 1.0 to 6.0, preferably of 1.5 to 4.0, more preferably of 2.0 to 3.2.

Suitable cycloaliphatic diisocyanates for preparing the hydroxyurethanes B) are those of the molecular weight range 166 to 318 g/mol, such as 1,3- and/or 1,4-diisocyanatocyclohexane, 1,4-diisocyanato-3,3,5-trimethylcyclohexane, 1,3-diisocyanato-2(4)-methylcyclohexane, 1-isocyanato-3,3,5-trimethyl-5-isocyanatomethylcyclohexane (isophorone diisocyanate, IPDI), 1-isocyanato-1-methyl-4(3)isocyanatomethylcyclohexane, 1,8-diisocyanato-p-menthane, 4,4'-diisocyanato-1,1'-bi(cyclohexyl), 4,4α-diisocyanato-3,3'-dimethyl-1,1'-bi(cyclohexyl), 4,4'-diisocyanato-2,2',5,5'-tetramethyl-1,1'-bi(cyclohexyl), 4,4'- and/or 2,4'-diisocyanatodicyclohexylmethane, 4,4'-diisocyanato-3,3'-dimethyldicyclohexylmethane, 4,4'-diisocyanato-3,3',5,5'-tetramethyldicyclohexylmethane, 1,3-diisocyanatoadamantane, and 1,3-dimethyl-5,7-diisocyanatoadamantane, and also any desired mixtures of such diisocyanates.

Likewise suitable are the polyisocyanates obtainable from these cycloaliphatic diisocyanates, more particularly those polyisocyanates with isocyanurate, biuret, uretdione and/or allophanate structure, of the kind described by way of example in J. Prakt. Chem. 336 (1994) 185-200 and EP-A 0 649 866, for example.

Preferred cycloaliphatic isocyanate components for preparing the hydroxyurethanes B) are IPDI, 1,3-diisocyanato-2(4)-methylcyclohexane, 4,4'- and/or 2,4'-diisocyanatodicyclohexylmethane and also polyisocyanates based on these diisocyanates.

Particular preference is given to employing IPDI, 4,4'- and/or 4,2'-diisocyanatodicyclohexylmethane, polyisocyanurate polyisocyanates based on these diisocyanates, or any desired mixtures of such di- and polyisocyanates.

For the preparation of the hydroxyurethanes B) the stated cycloaliphatic di- and/or polyisocyanates are reacted with a molar excess of suitable hydroxy-functional compounds, preferably those of the molecular weight range 32 to 300 g/mol.

Examples of suitable hydroxy-functional compounds are low molecular weight polyhydric aliphatic and cycloaliphatic alcohols, such as 1,2-ethanediol, 1,2- and 1,3-propanediol, the isomeric butanediols, pentanediols, hexanediols, heptanediols and octanediols, 1,2- and 1,4-cyclohexanediol, 1,4-cyclohexanedimethanol, 4,4'-(1-methylethylidene)biscyclohexanol, 1,2,3-propanetriol, 1,1,1-trimethylolethane, 1,2,6-hexanetriol, 1,1,1-trimethylolpropane, 2,2-bis(hydroxymethyl)-1,3-pro-panediol and 1,3,5-tris(2-hydroxyethyl)isocyanurate, ether alcohols, such as diethylene glycol, triethylene glycol, tetraethylene glycol and the isomeric dipropylene glycols, for example, or ester alcohols, such as neopentyl glycol hydroxypivalate.

Also suitable hydroxy-functional compounds, however, are simple amino alcohols, such as 2-aminoethanol, 2-(methylamino)ethanol, diethanolamine, N-methyldiethanolamine, triethanolamine, 3-amino-1-propanol, 1-amino-2-propanol, bis(2-hydroxypropyl)amine, bis(2-hydroxypropyl)methylamine, 2-(hydroxyethyl)bis(2-hydroxypropyl)amine, tris(2-hydroxypropyl)amine, 4-amino-2-butanol, 2-amino-2-methylpropanol, 2-amino-2-methyl-1,3-propanediol and 2-amino-2-hydroxypropyl-1,3-propanediol.

Where appropriate it is possible when preparing the hydroxyurethanes B), for the purpose for example of setting a defined OH functionality or for achieving specific properties, however, to use monofunctional synthesis components as well, examples being simple alcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, hydroxymethylcyclohexane, 3-methyl-3-hydroxymethyloxetane, n-hexanol, 2-ethyl-1-hexanol or 1-methoxy-2-propanol and tetrahydrofurfuryl alcohol, monofunctional ether alcohols, such as 2-methoxyethanol, 2-ethoxyethanol, 2-propoxyethanol, 2-butoxyethanol, diethylene glycol monomethyl ether, diethylene glycol monoethyl ether, diethylene glycol monobutyl ether, 3-methoxy-1-butanol and glycerol 1,3-diethyl ether, monofunctional ester alcohols, such as butyl glycolate and ethyl lactate, monofunctional dialkylamino alcohols, such as 2-(dimethylamino) ethanol, 2-(diethylamino)ethanol, 2-(dibutylamino)ethanol, 3-dimethylamino-1-propanol, 1-dimethylamino-2-propanol, 1-diethylamino-2-propanol and 2-(2-dimethylaminoethoxy) ethanol, monofunctional mercaptans, such as butyl mercaptan and dodecyl mercaptan, or monoamines such as methylamine, ethylamine, n-propylamine, isopropylamine, the isomeric butylamines, pentylamines, hexylamines and octylamines, n-dodecylamine, n-tetradecylamine, n-hexadecylamine, n-octadecylamine, cyclohexylamine, the isomeric methylcyclohexylamines, aminomethylcyclohexane, 2-methoxyethylamine, 3-methoxypropylamine, dimethylamine, diethylamine, dipropylamine, diisopropylamine, dibutylamine, diisobutylamine, bis(2-ethylhexyl)amine, N-methyl- and N-ethyl-cyclohexylamine or dicyclohexylamine, for example.

In the preparation of the hydroxyurethanes B) it is also possible to use the abovementioned hydroxy-, mercapto- and/or amino-functional compounds in the form of any desired mixtures.

Preferred reactants employed for the stated cycloaliphatic di- and/or polyisocyanates are simple diols or amino alcohols of the stated type with a molecular weight of 62 to 150 g/mol, where appropriate in combination with monoalcohols or monoamines of the stated type.

Very particular preference is given to the use of 1,3- and 1,4-butanediol, 1,6-hexanediol, 2,2,4-trimethyl-1,3-pentanediol, 1,4-cyclohexanedimethanol, 2-(methylamino)ethanol, diethanolamine, n-propanol, isopropanol and/or dibutylamine.

In the preparation of the hydroxyurethanes B) the stated starting components are reacted with one another in proportions such that the resulting products have the aforementioned characteristics, i.e. an average molecular weight of 260 to 8000 g/mol, preferably 275 to 6000 g/mol, more preferably of 290 to 5000 g/mol, and an average OH functionality of 1.0 to 6.0, preferably of 1.5 to 4.0, more preferably of 2.0 to 3.2.

Depending on the nature and amount of the raw materials used in their preparation, the hydroxyurethanes B) generally constitute viscous to solid substances. In the context of the process of the invention they can in principle be used in solvent-free form, but are preferably employed in a form in which they are dissolved using suitable solvents.

Examples of suitable solvents for this purpose are the typical paint solvents, known from paint chemistry, that are inert towards isocyanate groups, such as ethyl acetate, butyl acetate, ethylene glycol monomethyl or monoethyl ether acetate, 1-methoxyprop-2-yl acetate, 3-methoxy-n-butyl acetate, acetone, 2-butanone, 4-methyl-2-pentanone, cyclohexanone, toluene, xylene, chlorobenzene, white spirit, highly substituted aromatics, of the kind in commerce, for example, under the names solvent naphtha, Solvesso®, Isopar®, Nappar® (Deutsche EXXON CHEMICAL GmbH, Cologne, Del.) and Shellsol® (Deutsche Shell Chemie GmbH, Eschbom, Del.), but also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents.

The implementation of the process of the invention is generally such that the polyisocyanate component A) is introduced as an initial charge, preferably under inert gas at a temperature of 20 to 150° C., preferably of 30 to 120° C., and subsequently, with stirring, the hydroxyurethane component B), present where appropriate in solution in a solvent of the stated kind, is added in an amount of 2% to 80% by weight, preferably of 4% to 60% by weight, more preferably of 6% to 50% by weight, based on the total amount of components A) and B) as calculated on the basis of the solvent-free form.

The preparation of the hydroxyurethanes B) and the reaction to give the process products of the invention may take place without catalysis, but in order to accelerate the reaction it is also possible to use the typical urethanization catalysts that are known from polyurethane chemistry, examples being tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine or metal salts such as iron(III) chloride, zinc chloride, zinc octoate, zinc 2-ethylcaproate, zinc acetylacetonate, tin(II) octoate, tin(II) ethylcaproate, tin(I) palmitate, dibutyltin(IV) dilaurate, zirconium(IV) 2-ethyl-1-hexanoate, zirconium (IV) neodecanoate, zirconium(IV) naphthenate, zirconium (IV) acetylacetonate, aluminium tri(ethyl acetoacetate), bismuth(III) 2-ethylhexanoate, bismuth(III) octoate, bismuth (III) neodecanoate and molybdenum glycolate.

These catalysts are employed where appropriate in amounts of 0.001% to 2.0% by weight, preferably 0.01% to 0.2% by weight, based on the total amount of the starting components A) and B) used.

The course of the reaction in the process of the invention may be monitored by means, for example, of titrimetric determination of the NCO content. Following complete urethanization, the process products of the invention take the form of virtually colourless, clear substances, which as and when necessary can be adjusted to a desired viscosity using the paint solvents identified above.

The new polyisocyanate mixtures of the invention, containing cycloaliphatic structural elements, generally possess, based on the solvent-free form, a linear-aliphatically attached isocyanate group content of 4.0% to 26.0% by weight, preferably of 6.0% to 23.0% by weight, more preferably of 8.0% to 22.0% by weight, and an average NCO functionality of 1.9 to 8.0, preferably of 2.0 to 6.0, more preferably of 2.5 to 4.5.

The polyisocyanate mixtures of the invention, containing cycloaliphatic structural elements and preferably carrying exclusively linear-aliphatically attached isocyanate groups, represent valuable starting materials for the production of polyurethane plastics by the polyaddition process.

They are outstandingly suitable as curing agents for two-component polyurethane coating materials, in which the polyhydroxyl compounds present as reactants for the polyisocyanate mixtures are the typical polyether polyols, polyester polyols, polycarbonate polyols and/or polyacrylate polyols. Particularly preferred reactants for the process products of the invention are polyacrylates which contain hydroxyl groups, i.e. polymers and copolymers of (meth) acrylic acid alkyl esters, where appropriate with styrene or other copolymerizable olefinically unsaturated monomers.

Generally speaking, the coating compositions formulated with the polyisocyanate mixtures according to the invention, in which, where appropriate, the auxiliaries and adjuvants that are typical in the coatings sector may be incorporated, such as flow control assistants, colour pigments, fillers or matting agents, for example, possess good coatings properties even on room-temperature drying.

In comparison to coating films produced using purely linear-aliphatically polyisocyanates, such as high-functionality HDI trimers, for example, coatings crosslinked by means of the inventively prepared polyisocyanate mixtures are distinguished by significantly quicker drying and also a higher ultimate hardness. In relation to the likewise quick-drying coating films which comprise as their crosslinker component, in accordance with the prior art, polyisocyanate mixtures of HDI trimers and IPDI trimers, inventively obtained coatings additionally exhibit sharply improved solvent resistance and chemical resistance. The polyisocyanate mixtures of the invention containing cycloaliphatic structural elements therefore unite the quick drying and high ultimate hardness of cycloaliphatic polyisocyanate crosslinkers with the rapid chemical curing and resultant good resistance properties of linear-aliphatic polyisocyanates.

As will be appreciated, however, they may also be dried under forced conditions at elevated temperature or by baking at temperatures up to 260° C.

In order to control the rate of cure, it is possible when formulating the coating compositions to include suitable catalysts, examples being the above-described urethanization catalysts that are typical in polyurethane chemistry.

Of course, the inventive polyisocyanate mixtures containing cycloaliphatic structural elements can also be employed in a form in which they have been blocked with blocking agents known per se from polyurethane chemistry, in combination with the aforementioned film-forming binders or film-forming binder components, as one-component PUR baking systems. Examples of suitable blocking agents include diethyl malonate, ethyl acetoacetate, activated cyclic ketones, such as cyclopentanone-2-carboxymethyl ester and -carboxyethyl ester, acetone oxime, butanone oxime, ε-caprolactam, 3,5-dimethylpyrazole, 1,2,4-triazole, dimethyl-1,2,4-triazole, imidazole, benzyl-tert-butylamine or any desired mixtures of these blocking agents.

The invention accordingly also provides the use of the polyisocyanate mixtures of the invention for producing polyisocyanates blocked with blocking agents known from polyurethane chemistry, and also the resulting blocked polyisocyanates themselves.

The process products of the invention can also be combined with polyamines, such as the polyaspartic acid derivatives known from EP-B 0 403 921, or else with polyamines of the kind whose amino groups are present in blocked form, such as polyketimines, polyaldimines or oxazolanes, for example. Under the influence of moisture, these blocked amino groups form free amino groups and also, in the case of the oxazolanes, free hydroxyl groups, which are consumed by crosslinking reaction of the isocyanate groups of the polyisocyanate mixtures of the invention.

The polyisocyanate mixtures of the invention are also suitable as crosslinker components for binders or binder components that are present in dispersion or solution in water and contain groups that are reactive towards isocyanate groups, these groups being, more particularly, alcoholic hydroxyl groups, in the preparation of aqueous two-component polyurethane systems. In this context they can be used either as they are, i.e. in hydrophobic form, or else in a form in which they have been modified hydrophilically by known methods, as for example in accordance with EP-B 0 540 985, EP-B 0 959 087 or EP-B 1 287 052.

In all coating combinations the process products of the invention and the reactants are present in amounts such that for each, optionally blocked, isocyanate group there are 0.5 to 3, preferably 0.6 to 2.0, more preferably 0.8 to 1.6 optionally blocked, isocyanate-reactive groups.

Where appropriate the polyisocyanate mixtures of the invention may also, however, be admixed in minor amounts to non-functional film-forming binders for the purpose of obtaining very specific properties: for example, as an adhesion promoter additive.

Substrates suitable for coatings formulated by means of the polyisocyanate mixtures of the invention containing cycloaliphatic structural elements are any desired substrates, such as metal, wood, glass, stone, ceramic materials, concrete, hard and flexible plastics, textiles, leather and paper, for example, which prior to coating may where appropriate also be provided with typical primers.

Further provided by this invention, therefore, are coating compositions comprising the polyisocyanate mixtures of the invention, and also the substrates coated with these coating compositions.

EXAMPLES

All percentages are based—save for any indication to the contrary—on the weight.

The NCO contents were determined in accordance with DIN EN ISO 11909.

All of the viscosity measurements took place at 23° C. with a Physica MCR 51 rheometer from Anton Paar Germany GmbH (Ostfildem) in accordance with DIN EN ISO 3219.

Starting polyisocyanate A1)
HDI polyisocyanate containing isocyanurate groups, prepared by the process of EP-A 0330966.
Solids content: 100%
NCO content: 21.6%
Monomeric HDI: 0.1%
Average NCO functionality: 3.4
Viscosity: 2500 mPas (23° C.)

Starting polyisocyanate A2)
HDI polyisocyanate containing isocyanurate groups, prepared by the process of EP-A 0 330 966.
Solids content: 100%
NCO content: 23.0%
Monomeric HDI: 0.1%
Average NCO functionality: 3.1
Viscosity: 1200 mPas (23° C.)

Starting polyisocyanate A3)
HDI polyisocyanate containing iminooxadiazinedione groups, prepared by the process of EP-A 0 798 299.
Solids content: 100%
NCO content: 23.5%
Monomeric HDI: 0.3%
Average NCO functionality: 3.1
Viscosity: 700 mPas (23° C.)

Starting polyisocyanate A4)
HDI polyisocyanate containing uretdione groups, prepared by the process of EP-A 1 422 223.
Solids content: 100%
NCO content: 22.9%
Monomeric HDI: 0.1%
Average NCO functionality: 2.2
Viscosity: 100 mPas (23° C.)

Starting polyisocyanate A5)
IPDI polyisocyanate containing isocyanurate groups, prepared by the process of EP-A 0 003 765.
Solids content: 70% in butyl acetate
NCO content: 11.8%
Monomeric IPDI: 0.3%
Average NCO functionality: 3.2
Viscosity: 600 mPas (23° C.)

Starting polyisocyanate A6)
HDI polyisocyanate containing isocyanurate groups, prepared by the process of EP-A 0 330 966.
Solids content: 90% in butyl acetate
NCO content: 17.8%
Monomeric HDI: 0.1%
Average NCO functionality: 4.1
Viscosity: 1800 mPas (23° C.)

Hydroxyurethane B1)
A reaction vessel with stirrer, thermometer and reflux condenser was charged with an alcohol mixture consisting of 135 g (3.0 eq) of 1,3-butanediol and 60 g (1.0 eq) of 1-propanol, together with 0.05 g of DBTL in 622 g of butyl acetate and this initial charge was heated to 80° C. Over the course of 1 hour, at this temperature, 1068 g (3.0 eq) of the starting polyisocyanate A5) were metered in. Subsequently the mixture was heated to 110° C. and stirred at the same temperature until reaction was complete (disappearance of the NCO band at 2270 cm$^{-1}$ in the IR spectrum). This gave a colourless, clear hydroxyurethane solution having the following characteristics (based on solution):
Solids content: 50%
OH content: 0.90%
Equivalent weight: 1885 g/eq OH
Average OH functionality: 2.3

Hydroxyurethane B2)
Using the process described for hydroxyurethane B1), 1077 g (3.0 eq) of the starting polyisocyanate A5) were reacted with a mixture of 219 g (3.0 eq) of 2,2,4-trimethyl-1,3-pentanediol, 60 g (1.0 eq) of 2-propanol, 0.08 g of DBTL and 710 g of butyl acetate. This gave a colourless, clear hydroxyurethane solution having the following characteristics (based on solution):
Solids content: 50%
OH content: 0.82%
Equivalent weight: 2069 g/eq OH
Average OH functionality: 2.3
Hydroxyurethane B3)

Using the process described for hydroxyurethane B1), 111 g (1.0 eq) of IPDI were reacted with 109.5 g of 2,2,4-trimethyl-1,3-pentanediol, in 220.5 g of butyl acetate. This gave a colourless, clear hydroxyurethane solution having the following characteristics (based on solution):
Solids content: 50%
OH content: 1.93%
Equivalent weight: 879 g/eq OH
Average OH functionality: 2.0
Hydroxyurethane B4)

Using the process described for hydroxyurethane B1), 524 g (4.0 eq) of 4,4'-diisocyantodicylcohexylmethane in 962 g of butyl acetate were reacted with 438 g (6.0 eq) of 2,2,4-trimethyl-1,3-pentanediol in the presence of 0.044 g of DBTL as catalyst. This gave a colourless, clear hydroxyurethane solution having the following characteristics (based on solution):
Solids content: 50%
OH content: 1.77%
Equivalent weight: 959 g/eq OH
Average OH functionality: 2.0
Hydroxyurethane B5)

Using the process described for hydroxyurethane B1), 1068 g (3.0 eq) of the starting polyisocyanate A5) were reacted with a mixture of 216 g (3.0 eq) of cyclohexanedimethanol, 60 g (1.0 eq) of 1-propanol, 0.06 g of DBTL and 703 g of butyl acetate. This gave a colourless, clear hydroxyurethane solution having the following characteristics (based on solution):
Solids content: 50%
OH content: 0.83%
Equivalent weight: 2045 g/eq OH
Average OH functionality: 2.3
Hydroxyurethane B6)

Using the process described for hydroxyurethane B1), 1068 g (3.0 eq) of the starting polyisocyanate A5) were reacted with a mixture of 112.5 g (1.5 mol) of 2-(methylamino)ethanol, 129 g (1.0 mol) of dibutylamine and 668 g of butyl acetate. This gave a colourless, clear hydroxyurethane solution having the following characteristics (based on solution):
Solids content: 50%
OH content: 0.86%
Equivalent weight: 1973 g/eq OH
Average OH functionality: 2.3
Hydroxyurethane B7)

Using the process described for hydroxyurethane B1), 350 g (1.0 eq) of the starting polyisocyanate A5) were reacted with a mixture of 146 g (2.0 eq) of 2,2,4-trimethyl-1,3-pentanediol, 0.03 g of DBTL and 156 g of butyl acetate. This gave a colourless, clear hydroxyurethane solution having the following characteristics (based on solution):
Solids content: 60%
OH content: 2.61%
Equivalent weight: 650 g/eq OH
Average OH functionality: 3.2

Example 1

Inventive

A stirred vessel with internal thermometer and reflux condenser was charged with 2925 g of polyisocyanate A1) together with 715 g of butyl acetate at 80° C. Over the course of 2 h, 1885 g of the hydroxyurethane B1)—corresponding to an NCO/OH equivalent ratio of 15:1—were metered in and the mixture was stirred at the same temperature for a further 2 h. Thereafter the reaction mixture was heated to 110° C. and stirred for a further 3 h. Cooling to room temperature gave a virtually colourless, clear solution of an inventive polyisocyanate mixture having the following characteristics:
Solids content: 70%
NCO content: 10.3%
Viscosity: 800 mPas
Average NCO functionality: 3.6

Examples 2 to 9

Inventive

In accordance with the process described in Example 1, polyisocyanate mixtures containing cycloaliphatic structural elements were prepared using different polyisocyanate components A) and hydroxyurethanes B). The table below shows the compositions (in each case in parts by weight) and characteristics of the inventive products.

|  | Example | | | | | | | |
| --- | --- | --- | --- | --- | --- | --- | --- | --- |
|  | 2 | 3 | 4 | 5 | 6 | 7 | 8 | 9 |
| Starting polyisocyanate A1) | 2925 | — | — | — | 2925 | 2925 | 1463 | 1463 |
| Starting polyisocyanate A2) | — | 2739 | — | — | — | — | — | — |
| Starting polyisocyanate A3) | — | — | 2681 | — | — | — | — | — |
| Starting polyisocyanate A4) | — | — | — | 734 | — | — | — | — |
| Hydroxyurethane B1) | — | — | — | — | — | — | — | — |
| Hydroxyurethane B2) | 2069 | 2069 | 2069 | — | — | — | — | — |
| Hydroxyurethane B3) | — | — | — | — | — | — | 879 | — |
| Hydroxyurethane B4) | — | — | — | — | — | — | — | 959 |
| Hydroxyurethane B5) | — | — | — | — | 2045 | — | — | — |
| Hydroxyurethane B6) | — | — | — | — | — | 1973 | — | — |
| Hydroxyurethanes B7) | — | — | — | 650 | — | — | — | — |
| Butyl acetate | 662 | 223 | 204 | 21 | 669 | 690 | 376 | 353 |
| NCO/OH equivalent ratio: | 15 | 15 | 15 | 4 | 15 | 15 | 7.5 | 7.5 |
| Solids content [%]: | 70 | 75 | 75 | 80 | 70 | 70 | 70 | 70 |
| NCO content [%]: | 10.4 | 11.7 | 11.9 | 9.0 | 10.4 | 10.5 | 10.0 | 9.8 |
| Viscosity [mPas]: | 500 | 1600 | 1100 | 8000 | 1000 | 500 | 600 | 900 |
| Average NCO functionality: | 3.6 | 3.3 | 3.3 | 2.7 | 3.6 | 3.6 | 3.8 | 3.8 |

Example 10

Use, Inventive and Comparison 100 parts by weight of a hydroxy-functional polyacrylate in 72% strength solution in butyl acetate and having an OH content of 3.4%, and being composed essentially of 38.9% hydroxyethyl methacrylate, 23.3% isobornyl acrylate, 18.6% styrene, 9.4% methyl methacrylate, 8.4% ethyl acrylate and 1.4% acrylic acid, were mixed with 0.5 part by weight of a commercially customary deaerating agent (Tego® Airex 945, Tego) and with 3.8 parts by weight of a 1% strength solution of DBTL in xylene, as catalyst, and the solids content was subsequently adjusted to 58% by addition of 20.7 parts by weight of a solvent mixture consisting of equal parts of butyl acetate, xylene and 1-methoxyprop-2-yl acetate. Added to this batch were 80.0 parts by weight of the inventive solvent-containing polyisocyanate mixture from Example 1 (corresponding to an NCO/OH equivalent ratio of 1:1), and the mixture was homogenized by intense stirring (2000 rpm). Subsequently the solids content was adjusted to 50% by addition of 52.0 parts by weight of the above-described solvent mixture of butyl acetate, xylene and 1-methoxyprop-2-yl acetate.

For the purpose of comparison, clear coating materials were produced by the same process from in each case 100 parts by weight of the above-described hydroxy-functional polyacrylate, 0.5 part by weight of Tego® Airex 945 and 3.8 parts by weight of the above-described DBTL solution, using 47.2 parts by weight of polyisocyanate A6) (=comparative 10 b) or using 45.0 parts by weight of a polyisocyanate mixture consisting 70% of polyisocyanate A1) and 30% of polyisocyanate A5) (=comparative 10 c), corresponding in each case to an NCO/OH equivalent ratio of 1:1. The solids content was likewise adjusted to 50% by addition of a total of 83.2 parts by weight (10 b) or 77.6 parts by weight of the above-described solvent mixture consisting of equal proportions of butyl acetate, xylene and 1-methoxyprop-2-yl acetate.

The coating materials were applied in a wet film thickness of 100 μm (approx. 50 μm dry) to glass plates and, after 15 minutes of flashing off, were dried at room temperature and under forced conditions (30 min/60° C.). In all cases, highly glossy, transparent coating films were obtained. The table below shows a comparison of the coatings properties of the coating-material batches and also of the coatings obtained:

|  |  | Polyisocyanate of | | |
|---|---|---|---|---|
|  |  | Example 10 a (inventive) | Example 10 b (comparison) | Example 10 c (comparison) |
| Flow time[a] Start value | [s] | 17 | 19 | 18 |
| after 1 h | [s] | 20 | 29 | 20 |
| after 2 h | [s] | 29 | 38 | 30 |
| after 4 h | [s] | 45 | 79 | 45 |
| Drying time at RT | [min] | 55 | 120 | 70 |
| Drying T3[b] after 10'/60° C. | [s] | 30 | 80 | 60 |
| Drying T4[b] after 20'/60° C. | [s] | 10 | 30 | 10 |
| Pendulum hardness[c] | [s] | 171 | 101 | 144 |
| Petroleum resistance[d] |  |  |  |  |
| RT drying | 1 d | 2 | 1 | 3 |
|  | 2 d | 1 | 0 | 1 |
|  | 3 d | 0 | 0 | 1 |
|  | 7 d | 0 | 0 | 1 |

-continued

|  |  | Polyisocyanate of | | |
|---|---|---|---|---|
|  |  | Example 10 a (inventive) | Example 10 b (comparison) | Example 10 c (comparison) |
| 20 min/60° C. | 1 d | 1 | 1 | 3 |
|  | 2 d | 0 | 0 | 1 |
|  | 3 d | 0 | 0 | 1 |
|  | 7 d | 0 | 0 | 1 |

[a] measured with the 4 mm ISO flow cup in accordance with DIN EN ISO 2431 at 20° C.
[b] degree of drying (DIN 53150)
[c] König pendulum hardness (DIN 53157), coating films dried 30'/60° C., then 7 days RT
[d] 5 min, evaluation: 0-5 (0 = coating film unchanged; 5 = fully broken down)

The comparison shows that the coating batch formulated by means of the polyisocyanate mixture prepared in accordance with the invention (Example 10 a) exhibits a longer pot life (see flow time) but significantly more rapid drying and also a higher ultimate hardness than the coating material prepared using the high-functionality HDI trimer A6) (Comparative Example 10 b). As compared with the likewise fast-drying coating film crosslinked with the polyisocyanate mixture of HDI trimer and IPDI trimer (Comparative Example 10 c), the coating obtained in accordance with the invention is distinguished more particularly by a strongly improved chemical resistance (see petroleum resistance).

Examples 11 to 13

Use

In accordance with the process described in Example 10, clear coating materials were prepared starting from the polyacrylate polyol described therein and using different polyisocyanate mixtures of the invention, observing an NCO/OH equivalent ratio of 1:1, and these clear coating materials were applied to glass plates and cured. The table below shows the compositions (in each case in parts by weight) of the coating formulations produced and also coatings properties of the coatings obtained.

|  |  | Example | | |
|---|---|---|---|---|
|  |  | 11 | 12 | 13 |
| Polyisocyanate from Example 2 |  | 80.8 | — | — |
| Polyisocyanate from Example 4 |  | — | 70.6 | — |
| Polyisocyanate from Example 6 |  | — | — | 80.8 |
| Polyacrylate polyol from Example 10 |  | 100.0 | 100.0 | 100.0 |
| Tego ® Airex 945 |  | 0.5 | 0.5 | 0.5 |
| DBTL solution (1% strength in xylene) |  | 3.8 | 3.8 | 3.8 |
| Butyl acetate, xylene, MPA (1:1:1) |  | 73.0 | 76.0 | 73.0 |
| Solids content [%]: |  | 50 | 50 | 50 |
| Flow time[a] Start value | [s] | 17 | 19 | 20 |
| after 1 h | [s] | 20 | 23 | 27 |
| after 2 h | [s] | 22 | 25 | 37 |
| after 4 h | [s] | 35 | 31 | 47 |
| Drying time at RT | [min] | 60 | 70 | 80 |
| Drying T3[b] after 10'/60° C. | [s] | 40 | 25 | 65 |
| Drying T4[b] after 20'/60° C. | [s] | 0 | 15 | 20 |
| Pendulum hardness[c] | [s] | 145 | 136 | 138 |
| Petroleum resistance[d] |  |  |  |  |
| RT drying | 1 d | 2 | 2 | 1 |
|  | 2 d | 0 | 0 | 1 |

-continued

|  |  | Example | | |
|---|---|---|---|---|
|  |  | 11 | 12 | 13 |
|  | 3 d | 0 | 0 | 0 |
|  | 7 d | 0 | 0 | 0 |
| 20 min/60° C. | 1 d | 2 | 2 | 1 |
|  | 2 d | 0 | 0 | 1 |
|  | 3 d | 0 | 0 | 0 |
|  | 7 d | 0 | 0 | 0 |

[a] measured with the 4 mm ISO flow cup in accordance with DIN EN ISO 2431 at 20° C.
[b] degree of drying (DIN 53150)
[c] König pendulum hardness (DIN 53157), coating films dried 30'/60° C., then 7 days RT
[d] 5 min, evaluation: 0-5 (0 = coating film unchanged; 5 = fully broken down)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for preparing polyisocyanate mixtures comprising cycloaliphatic structural elements and also linear-aliphatically attached free isocyanate groups, the process comprising reacting:
    A) a polyisocyanate component having an average functionality of 2.0 to 5.0 and a linear-aliphatically attached isocyanate group content (calculated at NCO; molecular weight=42) of 8.0% to 27.0% by weight
with
    B) 2 to 80% by weight, based on the total amount of components A) and B), of at least one hydroxyurethane which is based on a cycloaliphatic di- and/or polyisocyanate, is free from isocyanate groups, optionally contains urea groups, has a number-average molecular weight of 260 to 8000 g/mol and has an average OH functionality of 1.0 to 6.0
wherein the linear-aliphatically attached isocyanate group content of the resultant polyisocyanate mixtures is 4.0 to 26.0% by weight and the average NCO functionality is 1.9 to 8.0.

2. Process according to claim 1, wherein the isocyanate groups contained in the polyisocyanate mixtures are exclusively linear-aliphatically attached.

3. Process according to claim 1, wherein component A) comprises polyisocyanates with uretdione, isocyanurate, allophanate, biuret and/or iminooxadiazinedione structures based on hexamethylene diisocyanate.

4. Process according to claim 1, wherein component B) comprises hydroxyurethanes having a number-average molecular weight of 290 to 5000 g/mol.

5. Process according to claim 1, wherein component B) comprises hydroxyurethanes having an average OH functionality of 2.0 to 3.2.

6. Process according to claim 1, wherein component B) comprising hydroxyurethanes prepared using cycloaliphatic isocyanates selected from the group consisting of isophorone diisocyanate, 1,3-diisocyanato-2(4)-methylcyclohexane, 4,4'- and 2,4'-diisocyanatodicyclohexylmethane and polyisocyanates based on those diisocyanates.

7. Process according to claim 1, wherein component B) comprises hydroxyurethanes prepared using isocyanate-reactive compounds selected from the group consisting of 1,3- and 1,4-butanediol, 1,6-hexanediol, 2,2,4-trimethyl-1,3-pentanediol, 1,4-cyclohexanedimethanol, 2-(methylamino)ethanol, diethanolamine, n-propanol, isopropanol and dibutylamine.

8. Process according to claim 1, wherein component B) is used in an amount of 6% to 50% by weight, based on the total amount of components A) and B) based on solids content.

9. A polyisocyanate mixture obtained by a process according to claim 1.

10. A polyisocyanate mixture according to claim 9, wherein the isocyanate groups contained are proportionally or completely blocked.

11. A polyurethane composition produced from the polyisocyanate mixtures of claim 9.

12. A coating composition produced from the polyisocyanate mixtures according to claim 9.

13. A substrate coated with coating compositions according to claim 12.

* * * * *